(12) United States Patent
Shaikh et al.

(10) Patent No.: US 8,319,154 B2
(45) Date of Patent: Nov. 27, 2012

(54) SELF-HEATING FLUID CONTAINER

(75) Inventors: Jim Shaikh, London (GB); David Hartwanger, East London (ZA); Mike Watkinson, London (GB)

(73) Assignee: Jim Shaikh, London (GB)

( * ) Notice: Subject to any disclaimer, the term of this patent is extended or adjusted under 35 U.S.C. 154(b) by 1309 days.

(21) Appl. No.: 11/793,116

(22) PCT Filed: Apr. 12, 2006

(86) PCT No.: PCT/GB2006/050084
§ 371 (c)(1),
(2), (4) Date: Nov. 28, 2007

(87) PCT Pub. No.: WO2006/109098
PCT Pub. Date: Oct. 19, 2006

(65) Prior Publication Data
US 2008/0087270 A1    Apr. 17, 2008

(30) Foreign Application Priority Data

Apr. 13, 2005 (GB) .................................. 0507407.5
Nov. 9, 2005 (GB) .................................. 0522775.6

(51) Int. Cl.
*A47J 39/02* (2006.01)
*F28D 15/00* (2006.01)

(52) U.S. Cl. ... 219/387; 219/201; 219/439; 220/592.17; 165/104.17; 165/104.21

(58) Field of Classification Search .................. 219/200, 219/386, 387, 528, 621; 392/339, 341, 477, 392/496; 126/263.04, 263.05, 263.06, 263.08, 126/263.09, 400
See application file for complete search history.

(56) References Cited

U.S. PATENT DOCUMENTS

| | | | | |
|---|---|---|---|---|
| 4,696,338 A * | 9/1987 | Jensen et al. | ............. | 165/104.17 |
| 5,607,074 A * | 3/1997 | De Gennaro | ............. | 215/11.5 |
| 5,617,946 A * | 4/1997 | Acampora et al. | ............. | 200/407 |
| 5,884,006 A * | 3/1999 | Frohlich et al. | ............. | 392/339 |
| 6,029,651 A * | 2/2000 | Dorney | ............. | 126/263.07 |
| 6,123,065 A * | 9/2000 | Teglbjarg | ............. | 126/263.09 |
| 6,463,212 B1 * | 10/2002 | Salyer | ............. | 392/341 |
| 6,493,507 B2 * | 12/2002 | Salyer | ............. | 392/341 |
| 6,639,186 B1 * | 10/2003 | Perez | ............. | 219/387 |
| 6,791,004 B2 * | 9/2004 | Sprengard-Eichel et al. | | 604/361 |
| 6,968,888 B2 * | 11/2005 | Kolowich | ............. | 165/10 |
| 7,503,461 B1 * | 3/2009 | Hoffman et al. | ............. | 215/11.5 |
| 7,942,145 B2 * | 5/2011 | Palena et al. | ............. | 126/263.03 |
| 2001/0028791 A1 * | 10/2001 | Salyer | ............. | 392/341 |
| 2004/0255794 A1 | 12/2004 | Hoshino et al. | | |
| 2006/0081599 A1 * | 4/2006 | Anderson | ............. | 219/438 |
| 2007/0204851 A1 * | 9/2007 | Justo | ............. | 126/262 |

(Continued)

FOREIGN PATENT DOCUMENTS

CN        1064208 A        9/1992
(Continued)

*Primary Examiner* — Joseph M Pelham
(74) *Attorney, Agent, or Firm* — Carmody & Torrance LLP (57) ABSTRACT

A self-heating fluid connector comprising a housing in which is provided exothermic phase change material and one or more fluid channels extending from one end of the housing to the other, in thermal communication with the exothermic phase change material, whereby fluid passing through the fluid conduits is heated by the exothermic phase change material. The self-heating connector is particularly suited for use with a fluid container and a fluid delivery port such as a baby's bottle and feeding teat.

22 Claims, 5 Drawing Sheets

U.S. PATENT DOCUMENTS

| | | | |
|---|---|---|---|
| 2008/0087674 A1* | 4/2008 | Overgaard | 220/592.16 |
| 2008/0178865 A1* | 7/2008 | Retterer | 126/263.08 |
| 2008/0179311 A1* | 7/2008 | Koro et al. | 219/430 |
| 2008/0251063 A1* | 10/2008 | Palena et al. | 126/263.09 |
| 2009/0314667 A1* | 12/2009 | Beyers | 206/223 |
| 2012/0085724 A1* | 4/2012 | Barker | 215/11.2 |

FOREIGN PATENT DOCUMENTS

| | | |
|---|---|---|
| EP | 0 815 784 A1 | 1/1998 |
| EP | 1 570 775 A2 | 9/2005 |
| GB | 555273 | 8/1943 |
| GB | 2 398 478 A | 8/2004 |
| WO | 2004/054414 A1 | 7/2004 |

* cited by examiner

SELF-HEATING FLUID CONTAINER

CROSS REFERENCE TO RELATED APPLICATIONS

This application is a National Stage application of International Application No. PCT/GB2006/050084, filed Apr. 12, 2006.

The present invention relates to a self-heating fluid connector and to a self-heating fluid container. The present invention is particularly suitable for use with or as a baby's feeding bottle but is not limited to this application of the invention.

Various attempts have been made in the past to provide a container that was portable and that was capable of reliably heating through the contents of the container. An early version of such self-heating containers is described in GB 555,273. This document describes an inner container surrounded by an outer sleeve and a separate chamber positioned below the base of the inner container. A solid reagent which is capable of an exothermic chemical reaction in the presence of a second chemical is positioned between the walls of the inner chamber and the outer jacket. Unslaked lime is an example of the type of reagent that is described as being suitable for use with the self-heating container. Water is stored within the separate chamber, below the inner container, and the chamber has a frangible region which when broken permits escape of the water from the chamber into the region between the walls of the inner container and the outer jacket. Contact between the water and the unslaked lime generates heat which is thermally conducted towards the contents of the inner container. EP 0815784 describes a similar arrangement for a self-heating container which focuses on the mechanism for releasing the water into the solid reagent and on the efficiency of the heat transfer to the contents of the inner container.

Self-heating containers such as those described above encounter problems in ensuring the liquid reagent adequately mixes with the solid reagent. This, in turn, contributes to problems with the even distribution of heat throughout the contents of the inner container. Problems in this area can result in localised overheating and underheating of the contents of the inner container.

In the case of fluids, in addition to heating fluids in bulk using the type of container described above, it is also possible to heat fluids incrementally by means of the flow of the fluid past a heat source. US 2004/0255794 describes such an apparatus for heating a fluid. The apparatus comprises an iron core which has a primary winding connected to an AC supply and a second winding which is hollow and forms a heat pipe through which the fluid flows. An induced current in the heat pipe, arising from magnetic flux in the iron core generated by the primary winding, heats the fluid as it passes through the pipe. Unfortunately, the apparatus described in this document is dependent upon an external power source and so is not suitable for application to a portable, self-heating apparatus.

In CN 1064208 a feeding bottle for a baby is described in which the milk in the bottle is heated in a separate heating unit attached between the outlet of the bottle and the feeding teat. The heating unit has an electrical heating wire which generates heat when an electrical current is passed through it. The heat from the heating wire is conducted to a centre pipe through which milk from the feeding bottle passes to the teat. Here too, the heated unit has the disadvantage that it requires an external electrical power source to operate and as such the heating unit is not conveniently portable.

A very similar heating unit is described in WO 2004/054414 although in WO 2004/054414 the possibility of replacing the heating wire with a reagent that is capable of an exothermic chemical reaction is also mentioned albeit without any explanation of how this might be put into effect. However, the problems mentioned above associated with controlling heat generated as a result of an exothermic chemical reaction are likely to be insurmountable where the chemical reaction is being relied upon to provide continuous and controllable heating of a fluid flowing through an adjacent pipe.

The present invention seeks to address the problems encountered with known heating containers and seeks to provide self-heating apparatus specifically for use in the controlled heating of fluids.

The present invention therefore provides a self-heating fluid connector comprising a housing with first and second opposed ends, the housing being adapted for engagement with the opening of a fluid container; an exothermic phase change material within the housing; one or more fluid conduits extending between the first and second ends and being in thermal communication with the exothermic phase change material; and at least one initiator mounted in the housing for activating the exothermic phase change material whereby when activated heat is transferred to fluid caused to flow through the fluid conduits.

Also, the present invention separately provides a self-heating fluid connector comprising a housing with first and second opposed ends, the housing being adapted for engagement with the opening of a fluid container; an exothermic phase change material within the housing; one or more fluid channels provided on the exterior of the housing extending between the first and second ends and being in thermal communication with the exothermic phase change material; and at least one initiator mounted in the housing for activating the exothermic phase change material whereby when activated heat is transferred to fluid caused to flow along the fluid channels.

The present invention further separately provides a self-heating fluid connector comprising a housing with first and second opposed ends, the first end being adapted for attaching to the opening of a fluid container; an exothermic phase change material within the housing; one or more fluid conduits extending through the exothermic phase change material between the first and second ends; and a manually operable device in the housing for activating the exothermic phase change material whereby when activated heat is transferred to fluid caused to flow through the fluid conduits.

Preferably, the second end is adapted for attachment to a fluid delivery port and at least one of the first and second ends includes sealing means for forming a fluid seal with the fluid container or the fluid delivery port.

Furthermore, one or more of said one or more fluid conduits may follow, for example, a substantially spiral path or a straight path between said first and second ends. Fluid conduits provided with the self-heating connector have three possible functions: where the fluid conduits are in thermal contact with the exothermic phase change material, to pass fluid from the fluid container to the second end of the fluid connector and in so doing expose the fluid to heat generated by the exothermic phase change material; to permit air from the second end of the fluid connector to pass to the fluid container, without passing through the fluid in the heated conduits, thereby reducing aeration; and, where the fluid conduit is thermal insulated from the exothermic phase change material, to pass fluid from the container to the second end of the fluid connector without being heated, thereby "bypassing" the heat source and acting to moderate the temperature of the fluid at the second end of the fluid connector.

Also, the exothermic phase change material is preferably a material taken from the group comprising: sodium acetate trihydrate, lithium acetate dihydrate, calcium chloride dihydrate, calcium nitrate tetrahydrate, magnesium chloride hexahydrate, manganese sulphate hydrate and ferric chloride hexahydrate. In the context of this document reference to an exothermic phase change material is to be understood as to be reference to a material which is thermodynamically unstable and is capable of undergoing a thermodynamic change of state arising from changes in its chemical structure. Reference to exothermic phase change materials is not intended to encompass materials which generate heat as a result of a chemical reaction resulting in changes to the composition of the material.

Ideally, the manually operable device for activating the exothermic phase change material comprises a mechanical initiator in the form of a button mounted for inward movement with respect to the housing, the button having an uneven surface facing towards the interior of the housing for contact with the exothermic phase change material. The button is preferably formed of a non-metallic material, for example a plastics material.

In a preferred embodiment the self-heating fluid connector further includes temperature control means for controlling the temperature of the fluid at the second end of the fluid connector. The temperature control means may be adapted to control the rate of heat generation of the phase change material in which case said temperature control means may comprise at least one thermally conducting wall which divides the phase change material into a plurality of sections, each thermally conducting wall including one or more thermally controlled gateways connecting the phase change material sections. Alternatively, a flow "bypass" conduit embodies a means of temperature-based control and in combination with a flow control valve the volume of fluid that bypasses the heat source may be regulated to maintain the temperature of the fluid at the second end of the fluid connector within desired limits.

In an alternative aspect the present invention provides a self-heating baby's feeding bottle comprising a bottle; and a self-heating connector as described above and which includes attachment means for attaching a baby's feeding teat to either the bottle or the self-heating connector. Optionally, the baby's feeding bottle may additionally include a baby's feeding teat removably attached to either the bottle or the self-heating connector.

In a further alternative aspect the present invention provides a self-heating bottle which comprises a container having a first compartment and a second compartment permanently attached to or integral with the first compartment, the first compartment providing fluid containment and the second compartment containing an exothermic phase change material; one or more fluid conduits extending through the exothermic phase change material; a fluid outlet distant from the first compartment and in fluid communication with the one or more fluid conduits; and a manually operable device for activating the exothermic phase change material whereby when activated heat is transferred to fluid caused to flow through the fluid conduits.

Optionally the container may include attachment means adapted for attachment of a baby's feeding teat so that the teat is in fluid communication with the fluid outlet.

Ideally, the self-heating bottle further includes a valve for controlling a flow of air into the bottle and a heat indicator.

Embodiments of the present invention will now be described by way of example only, with reference to the accompanying drawings, in which.

Figure 1:
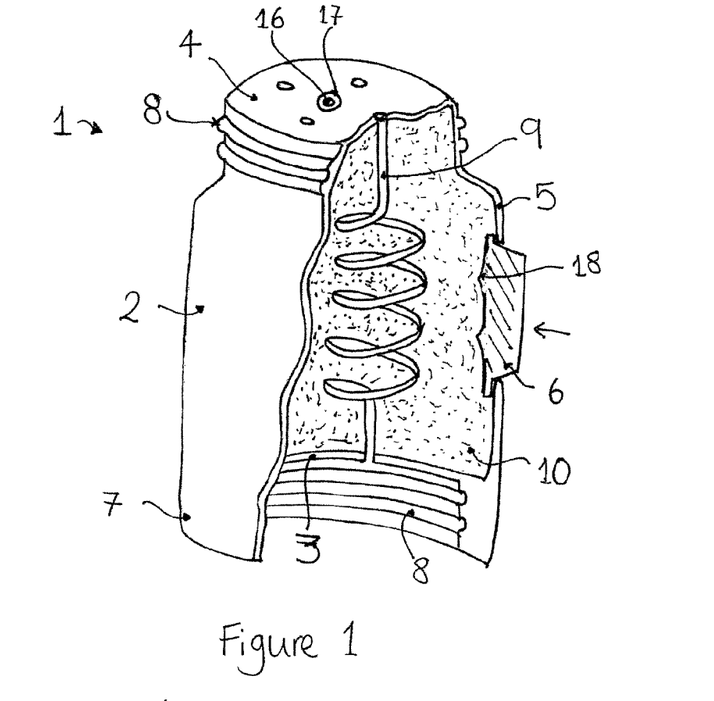
FIG. 1 is a cut-away schematic view of a self-heating fluid connector in accordance with the present invention.

The self-heating fluid connector 1 illustrated in FIG. 1 has a connector housing 2 which is generally cylindrical and closed at a first end 3 and an opposed second end 4. The wall 5 of the housing 2, which connects the two opposing ends, includes an aperture in which is slidably mounted a manually actuated button 6. The button extends through the wall 5 and is mounted for inward radial movement with respect to the housing 2.

Figure 2:
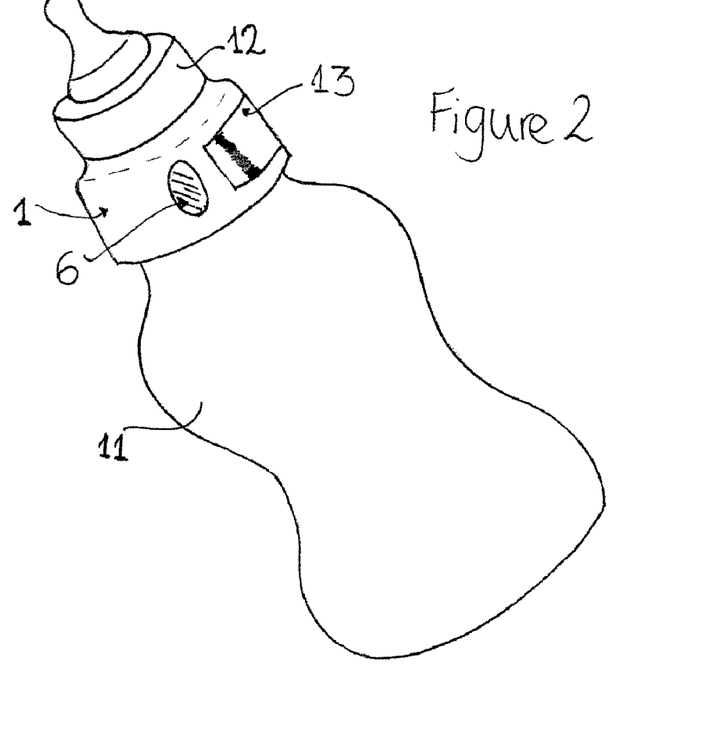
FIG. 2 illustrates a baby's feeding bottle incorporating the self-heating fluid connector of FIG. 1.

The first end 3 of the housing 2 has an axially extending skirt 7 which includes attaching means 8 for attaching the fluid connector 1 to a fluid source 11 such as the baby's bottle illustrate in FIG. 2. With the fluid connector of FIGS. 1 and 2, the attaching means is in the form of internal screw threads which are of a size and shape to conform to the standard neck of baby bottle designs.

The second end 4 of the housing 2 is of smaller diameter than the diameter of the main body of the housing and also includes attaching means 8, but in this case external screw threads, to enable the second end 4 to be attached to a fluid delivery port 12 such as the baby's teat illustrated in FIG. 2. Ideally, in each case the attaching means 8 provide a fluid seal against the escape of fluid at the junction of the fluid connector 2 with the fluid source 11 and with the fluid delivery port 12. It will, of course, be apparent that alternative attaching means may be employed where the fluid connector is to be attached to other fluid containers and other fluid delivery ports.

The housing 2 of the fluid connector is generally hollow and contains one or more fluid conduits 9 which extend through the axial length of the housing and which are open at the first and second ends 3, 4 of the housing. The conduits are fluid flow paths and may take a variety of forms such as, but not limited to, circular, square or annulus section conduits. In the case of FIGS. 1 and 2, the housing 2 includes four tubular fluid conduits each of which follows a substantially spiral path from the first to the second end. In the preferred embodiment for use with a baby's bottle, a fifth tubular conduit 16 of substantially straight form, aligned with the main axis of the fluid connector, is thermally insulated 17 and is used for temperature control flow "bypass" purposes. In addition, each fluid conduit comprises a shaped metallic or plastic pipe, stainless steel is preferred, having a 2.5 mm bore and extending an axial length of approximately 25-50 mm.

An exothermic phase change material 10 fills the space within the housing 2 and surrounds and is in direct or indirect thermal contact with each of the fluid conduits 9. The exothermic phase change material 10 is therefore physically separated from the fluid which flows through the fluid conduits 9 and is also physically separated from the fluid source 11 and the fluid delivery port 12. Particularly preferred exothermic phase change materials are: sodium acetate trihydrate, lithium acetate dihydrate, calcium chloride dihydrate, calcium nitrate tetrahydrate, magnesium chloride hexahydrate, manganese sulphate hydrate and ferric chloride hexahydrate. In each case, a phase change in the material 10 is activated by an initiator 18 in the form of mechanical means on the rear of the button 6. The form of the initiator may vary. In the illustrated embodiment the initiator 18 comprises the rear surface of the button 6 which is uneven and includes a plurality of projections extending away from the rear of the button 6 but in a preferred embodiment a metal or plastic pin is used (not illustrated) which is connected to the button 6. It is preferred that the initiator 18 is formed of a plastics material.

Furthermore, after a phase change has been activated in the material 10, the material 10 can be returned to its original phase by reheating, for example in a microwave oven or by boiling in water. Alternatively, internal heating elements may be embedded in the phase change material. Such internal heating elements may comprise electrically resistive material and include means for connection to a source of electricity. When connected to and forming a circuit with the source of electricity, the resistivity of the internal heating elements results in the elements heating up and the heat being conducted through the phase change material. The delivery of heat by the internal heating elements to the phase change material enables the phase change material to be returned to its original state after use and so ready for re-use.

The fluid conduits may be made from an electrically resistive material in which case the conduits themselves may be used as internal heating elements, thereby providing heat to reverse the phase change process, through the suitable application of an electric voltage. The apparatus required to generate and/or apply the voltage may form an integral part of the fluid connector, for example the source of electricity may be a battery in a separate compartment in the housing of the fluid connector, or may be housed in a separate device with the appropriate connection to the fluid connector.

In use, as illustrated in FIG. 2, the first end 3 of the fluid connector 1 is sealingly attached to the neck of a conventional baby's feeding bottle 11 containing milk, for example, and a conventional baby's teat 12 is attached to the second end 4 of the fluid connector. A one-way valve (not shown) is preferably provided with one of the fluid conduits so as to improve the passage of air from the teat to the bottle without aerating the heated fluid, when the arrangement of bottle, fluid connector and teat is upturned and milk in the baby's bottle is free to flow through the heated fluid conduits in the connector 1 to the teat 12. To warm the milk to be drunk by the baby, the button 6 of the fluid connector housing 2 is manually depressed. This causes the button 6 to move radially inwardly, thereby causing the initiator 18 to contact the phase change material within the housing 2. This manually applied compressive pressure activates the phase change process which, as an exothermic reaction, generates heat which is conducted to the fluid conduits 9 and to any fluid within the fluid conduits. Except, of course, for any temperature control conduits that are thermally insulated from the heat generated by the phase change process. Thus, rather than attempt to heat the bulk contents of the baby's feeding bottle, the self-heating fluid connector 1 heats the milk to be drunk by the baby incrementally as the milk flows through the fluid conduits 9 to the teat 12. The flow may be generated naturally through the action of gravity, by the action of the baby sucking on the teat or generated artificially through the use of some form of pump manually, mechanically or electrically powered. The substantially spiral path followed by each of the heating fluid conduits 9, as illustrated in FIG. 1, has been chosen and optimised as it provides improved heat transfer in comparison to straight conduits. However, alternative arrangements of fluid conduits are envisaged and are described in greater detail below.

As mentioned earlier, in the case of the fluid connector 1 of FIGS. 1 and 2, one of the fluid conduits 9 preferably includes a one-way valve (not shown) which prevents fluid flowing through the conduit from the feeding bottle and instead permits air within the teat to flow into the feeding bottle so as to equalise pressures either side of the fluid connector. Of course, alternative means may be employed to equalise pressure for example a separate air valve mounted at the first end 3 of the fluid connector 1 or in the bottle itself.

In addition, as shown in FIG. 2, the fluid connector 1 may additionally include a heat indicator 13 mounted on the exterior of the housing 2. The heat indicator 13 is used to indicate, for example by changing colour, when sufficient heat has been generated within the fluid connector 1 that milk flowing through the fluid conduits 9 will be heated to a desirable temperature for the baby. In the case of a baby feeding on milk, between 150 g and 350 g of the phase change material is required to provide sufficient heat to warm the maximum amount of milk (approx. 260 ml) usually drunk by a baby during a feed whilst still ensuring that the milk does not exceed temperatures of 50° C., with the usual rates of flow experienced when a baby feeds.

Figure 3:
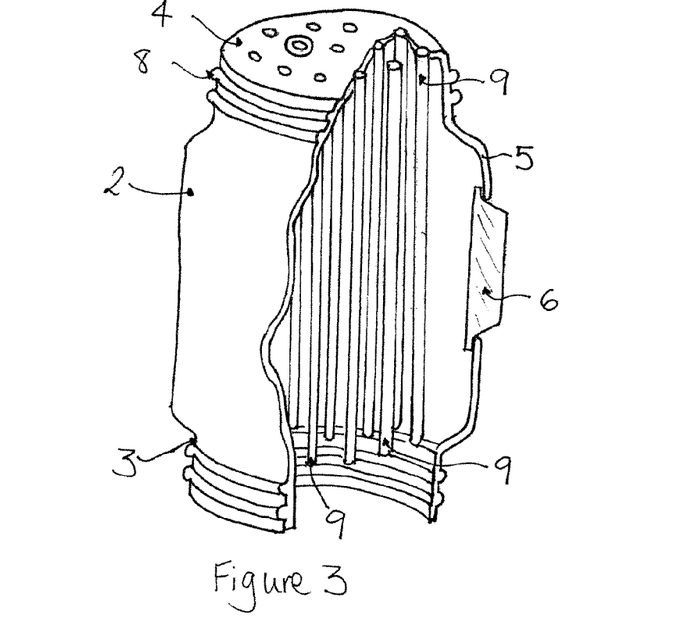
FIG. 3 is a cut-away sectional view of an alternative self-heating fluid connector in accordance with the present invention.

In FIG. 3 an alternative self-heating fluid connector is illustrated in which a large number of axially aligned fluid conduits 9 are arranged within the housing 2 (the phase change material has been omitted for the sake of clarity). Many of the features of this alternative self-heating fluid connector are identical to those illustrated in FIG. 1 and so like reference numerals have been used, where appropriate. As this arrangement reduces the amount of exothermic phase change material within the housing, this arrangement is more suitable for circumstances where only low levels of heating are required. Also, the attachment means 3 for attachment to a fluid source are shown as external threading on the housing as an alternative to the internal threading of FIGS. 1 and 2.

Figure 4:
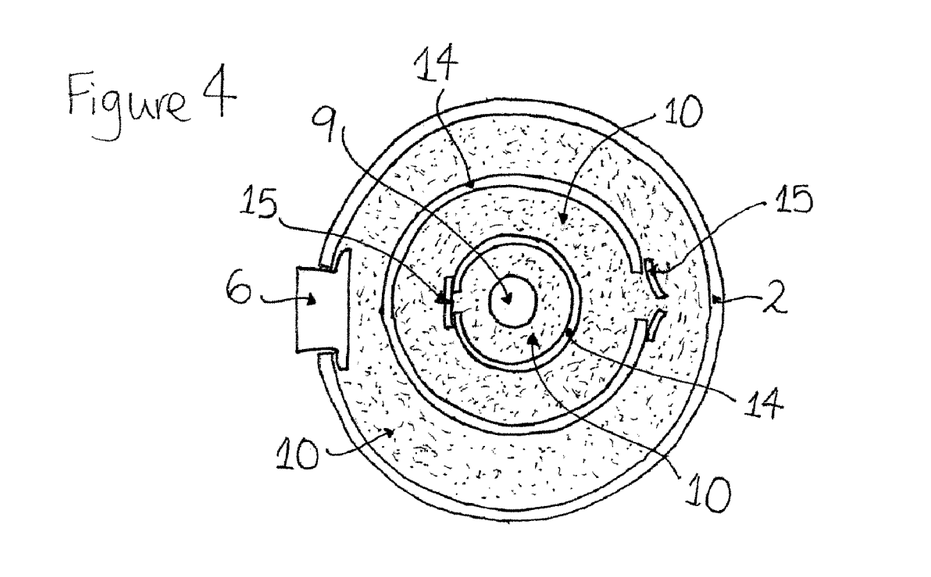
FIG. 4 is a sectional view from above of a second alternative self-heating fluid connector in accordance with the present invention.

In FIG. 4 a further alternative self-heating fluid connector is illustrated and like reference numerals have again been used, where appropriate. With this further alternative the housing 2 contains a single axially aligned fluid conduit 9 having a larger bore than those previously illustrated. Surrounding the fluid conduit 9 is a phase change material 10 but with this alternative arrangement the phase change material is divided into sections, with the sections forming concentric cylinders of the phase change material, with each cylinder separated from its adjacent cylinders by thermally conductive walls 14 each of which includes one or more thermally controlled gateways 15. By means of the thermally controlled gateways 15, an upper limit on the temperature within the housing can be applied. The thermally controlled gateways 15 remain open at lower temperatures so as to permit mechanical expansion of the phase change material through crystallisation to be transmitted sequentially to adjacent inner cylinder of phase change material 10 in turn. Where a predetermined maximum temperature is reached, the gateways 15 then close thereby preventing unaffected inner cylinders of the phase change material being activated. Once the temperature drops, the gateways 15 re-open thereby permitting re-continuation of the phase change chain reaction on the inner cylinders of material and the generation of more heat.

The heating connectors described above are self-contained units adapted for connection to a bottle or other fluid container or fluid source. However, the heating units may alternatively be formed integrally with the fluid container, as described below.

Figure 5:
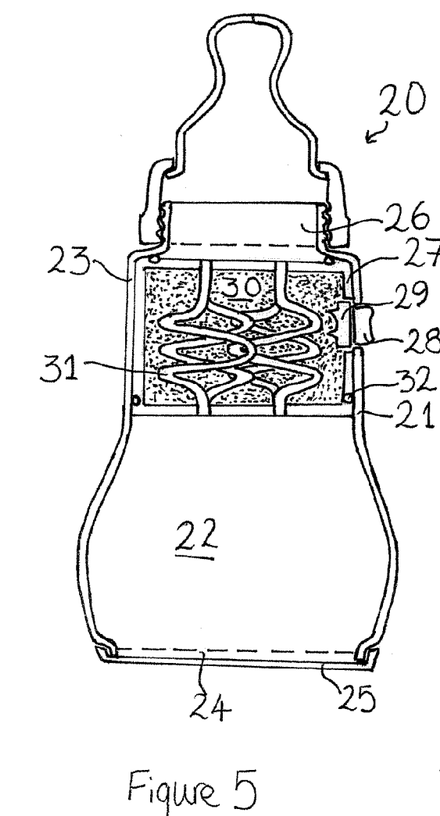
FIG. 5 is a sectional view of a self-heating fluid container in accordance with the present invention.

In FIG. 5 a self-heating fluid container 20 is shown with a baby's feeding teat attached. The self-heating fluid container 20 has a housing 21 which provides first and second compartments 22, 23. Access to the interior of the housing 21 is provided via an aperture 24 at its lower end (as illustrated). The aperture is closed by a cap 25 which engages with the housing in any conventional manner so as to ensure a fluid-tight seal. The upper end of the housing 21 (as illustrated) provides a heated fluid outlet 26 which in the case of a baby's feeding bottle comprises a neck which is adapted for attachment to a baby's feeding teat.

The first compartment 22 of the housing, which is adjacent the aperture 24, defines a space within which fluid, such as milk, may be contained. The second compartment 23 defines a space for housing a heating unit 27. The interior walls of the second compartment 23 are sized so as to provide a tight, interference, fit for the heating unit 27 and have an internal radius less than the radius of the aperture 24. Ideally, once fitted into the second compartment 23, the heating unit 27 is intended to remain in the compartment and not to be removable. A button 28 is provided in that part of the wall of the housing which forms part of the second compartment 23. The button 28 is mounted for radially inward movement and is positioned so as to be aligned with an initiator 29 mounted in the wall of the heating unit 27. The initiator 29 is optionally formed of a plastics material.

The walls of the heating unit 27 define an enclosed space within which an exothermic phase change material 30 is contained. The walls of the heating unit thus physically isolate the exothermic phase change material from the first compartment 22 and from the fluid outlet 26. Extending axially through the heating unit 27 are a plurality of fluid pipes 31 which provide a fluid path from the first compartment 22 to the heated fluid outlet 26 and which are in thermal contact with the exothermic phase change material. Four fluid pipes 31 are illustrated in FIG. 5 with each describing a spiral path. However, different numbers of pipes and alternate arrangements of the fluid pipes are envisaged whilst still providing a fluid path between the first compartment and the heated fluid outlet. One or more fluid seals 32 are provided on the exterior of the heating unit 27 to prevent fluid in the first compartment from penetrating between the walls of the heating unit and the housing 21.

In use, fluid is introduced into the first compartment 22 via the aperture 24. When the fluid is to be heated and dispensed from the container, the button 28 is pressed which engages with and acts on the initiator 29 to activate an exothermic phase change of the material within the heating unit which thereby produces heat. The container 20 may then be simply overturned to allow gravity to cause the fluid in the first compartment to flow through the pipes 31 or the fluid may be forced through the pipes by applying an external pressure difference to the fluid e.g. by applying a reduced pressure to the fluid outlet or by means of a pump powered manually, mechanically or electrically. As the fluid passes through the pipes 31, heat from the phase change material is conducted to the fluid so that the fluid at the outlet 26 of the container is warmer than the fluid in the first compartment. Here too a valved conduit may be used to equalise pressure either side of the heating unit.

Figure 6:
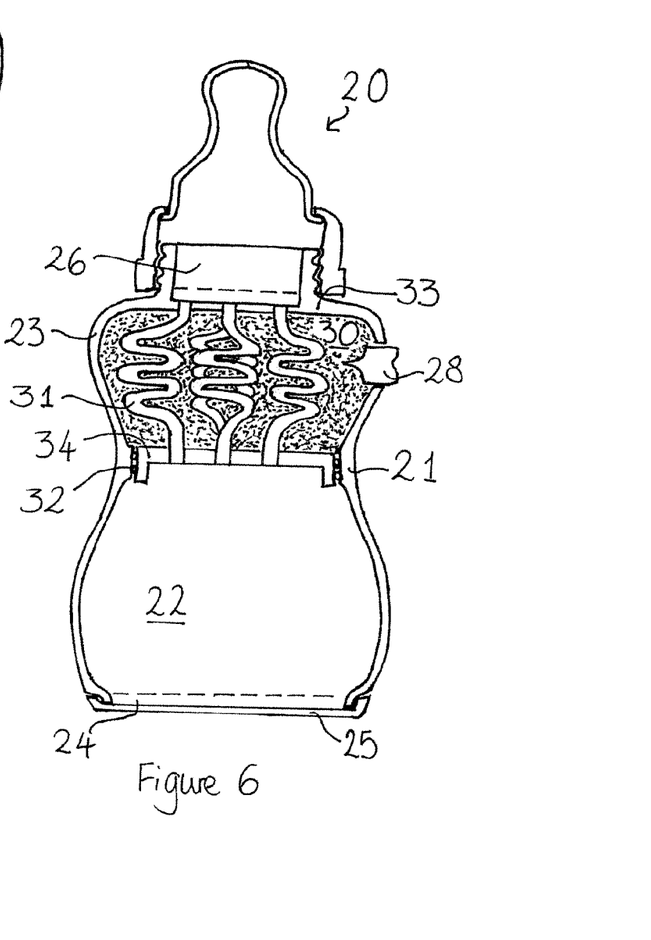
FIG. 6 is a sectional view of an alternative self-heating fluid container in accordance with the present invention.

Turning now to FIG. 6 an alternate self-heating container is illustrated, again with a baby's feeding teat, in which like reference numerals are employed, where appropriate. With this alternate container 20 no separate heating unit is provided. Instead, the second compartment 23 has an integral first end wall 33 adjacent the heated fluid outlet 26. The end wall 33 includes a plurality of apertures arranged to receive the first end of a corresponding plurality of fluid pipes 31. The first ends of the fluid pipes 31 thus engage with the apertures in the first end wall 33 and from the first end wall each pipe follows a spiral path across the second compartment 23 to engage with a second end wall 34 at the opposite end of the second compartment which has a similar arrangement of apertures for engagement with the fluid pipes 31. The second end wall 34 is sealingly attached to the inner surface of the walls of the housing 21 so as to define with the walls of the housing and the first end wall 33 an enclosed space within which the exothermic phase change material 30 is stored.

To construct this alternate self-heating container, the fluid pipes are attached to the apertures in the first end wall 33 and then the exothermic phase change material is poured into the space around the pipes as a fluid. The second end wall is then attached to the fluid pipes and to the housing walls to isolate the exothermic phase change material from the first compartment.

As there is no separate heating unit and the walls of the housing directly enclose the exothermic phase change material, with this version of the self-heating container no separate initiator 29 is required and instead, the rear surface of the manually operable button 28 which faces towards the exothermic phase change material acts as the initiator preferably by means of an uneven surface or one or more pin-like projections. It is preferred that either the entire button or at least the initiator part of the button 28 is formed of a plastics material.

With the self-heating containers of FIGS. 5 and 6 the fluid to be heated is poured into the container via the cap 25 at the bottom of the first compartment. Whilst this is the preferred option, it is envisaged that in the alternative the fluid could be poured through the fluid outlet, via a thermally insulated pipe in the second compartment, to the first compartment. In addition, the arrangement and the number of fluid pipes in the second compartment may be varied to increase or reduce the amount of heat the fluid is exposed to during its passage through the fluid pipes.

Furthermore, other features of the fluid connector such as, but not limited to, the addition of metallic material to enable the exothermic phase change material to be electrically heated up so as to restore it to its original state after use may be employed with the self-heating containers of FIGS. 5 and 6.

Figure 7:
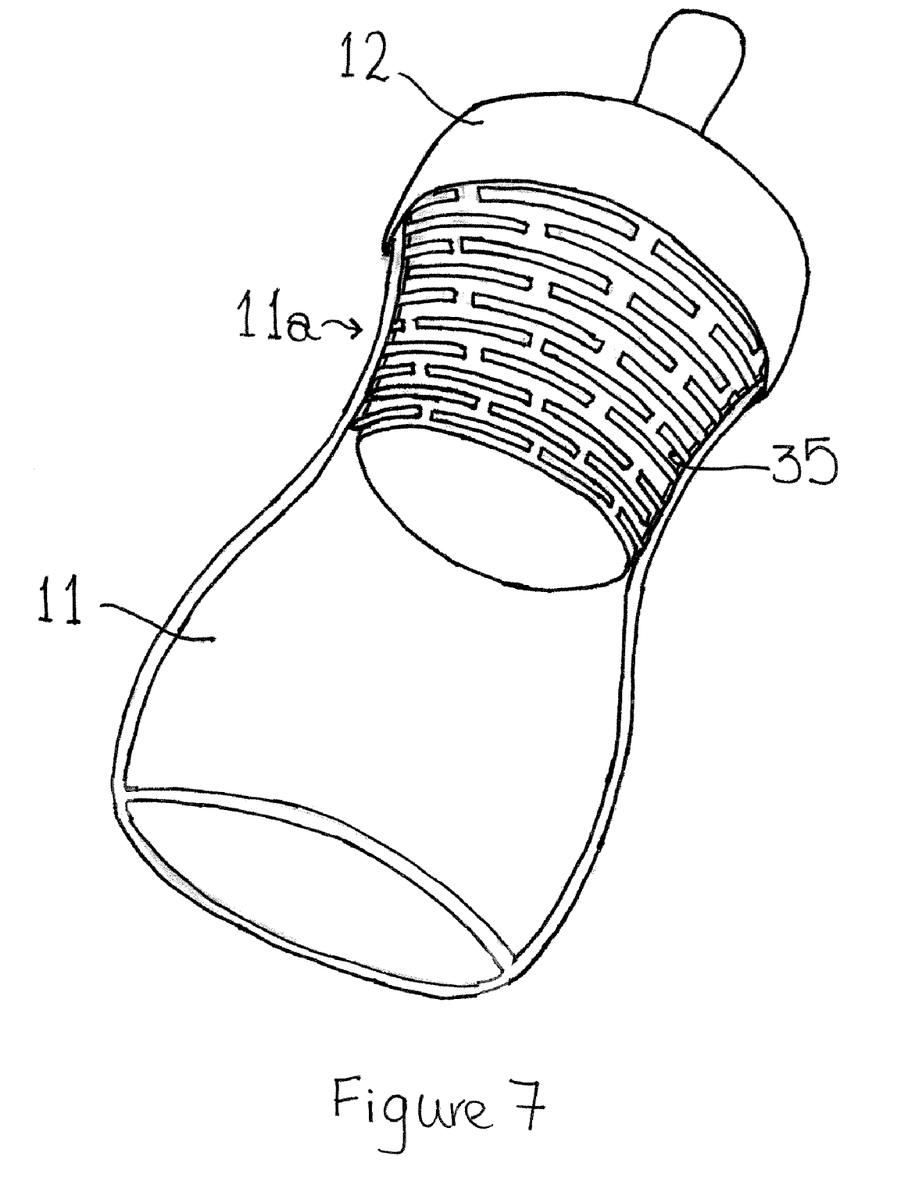
FIG. 7 is a perspective view of a third alternative self-heating fluid connector in position in a baby's feeding bottle, in accordance with the present invention.

In FIG. 7 a further alternative self-heating connector 35 is shown in the form of a plug mounted in and engaging with the neck of a baby's feeding bottle 11 with a feeding teat 12 attached to the top of the bottle. The self-heating plug 35 of FIGS. 7 to 9 has walls 36 defining a compartment 37 in which an exothermic phase change material 38 is located. A valved conduit 39 extends through the compartment 37 and has a one-way valve 40 provided at one end of the conduit 39. The valved conduit 39 is provided to equalise pressures either side of the self-heating plug. One or more initiators 41 are mounted in a first end wall 42 of the compartment 37 (three initiators are illustrated in the figures) and are mounted for axial sliding movement through the end wall 42. The initiators 41 are similar in design to the initiators in the earlier examples and are optionally made of a plastics material or a metallic material with either a roughed rear surface or one or more pin-like projections for initiating the exothermic phase change. The initiators 41 are preferably manually operable.

Figure 8:
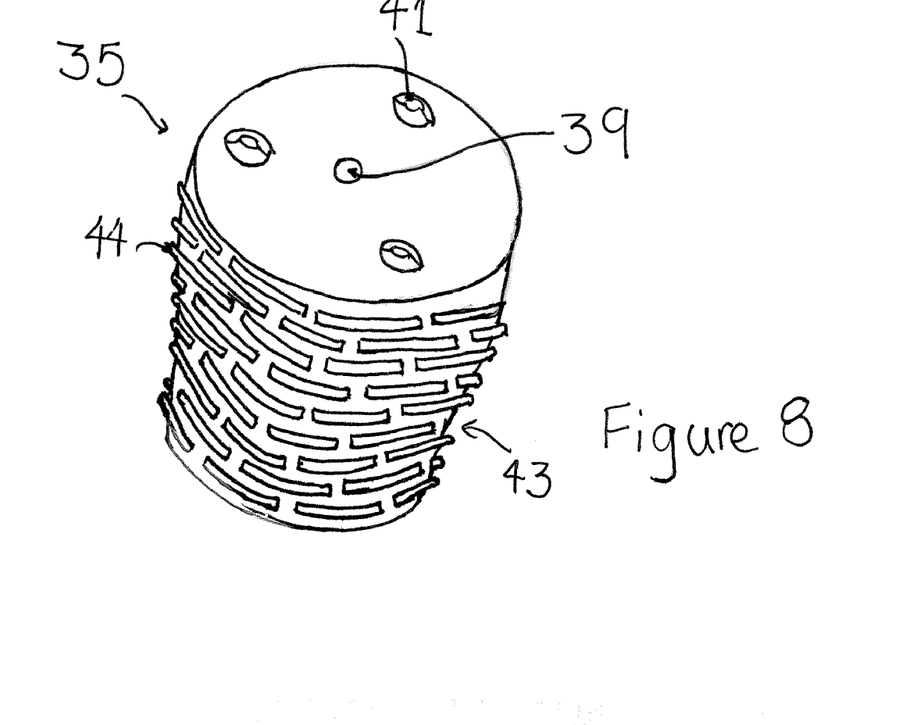
FIG. 8 is an enlarged perspective view of the self-heating fluid connector of FIG. 7.
Figure 9:
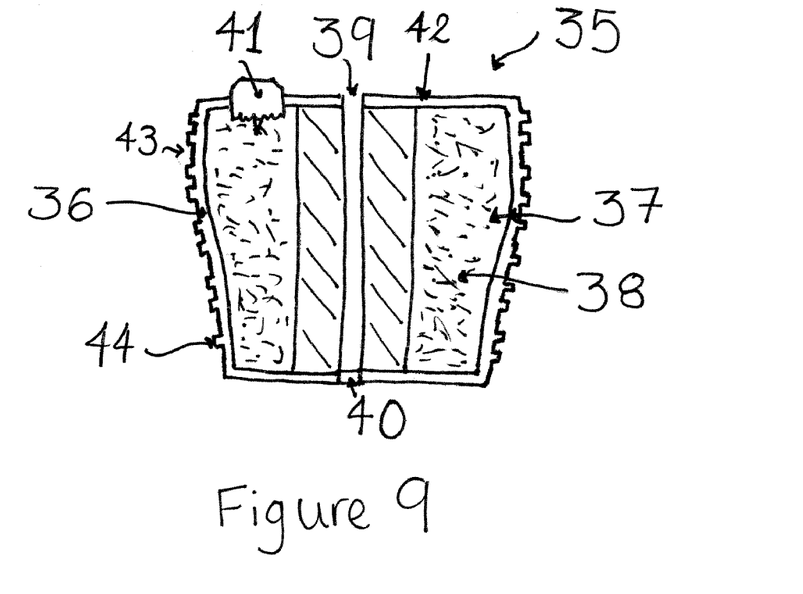
FIG. 9 is a sectional view through the self-heating fluid connector of FIGS. 7 and 8.

Alternatively, the initiators 41 may be positioned and sized so as to contact with the feeding teat or other fluid delivery port 12 and be automatically actuated as the feeding teat or fluid delivery port 12 is secured to the baby's bottle or other fluid container 11.

Unlike the earlier examples, the self-heating plug of FIGS. 7 to 9 does not include fluid conduits that extend through the compartment 37. Instead, one or more fluid pathways 43 are provided on the outer surface of the wall 36 of the self-heating plug 35. The fluid pathways 43 are defined by means of a series of separated outwardly projecting barriers 44 which define channels therebetween. Ideally, the barriers 44 are arranged circumferentially on the outer surface of the wall 36 but alternative arrangements of barriers establishing axial, labyrinthine, spiral or other convoluted pathways may be employed. The fluid pathways 43 may constitute a single channel for the fluid to follow from the fluid container to the fluid delivery port. Alternatively, as illustrated, the fluid pathway 43 may constitute a plurality of separate or interconnected channels which the fluid may follow. In the illustrated example, the fluid pathways 43 are a labyrinthine arrangement of interconnected channels.

The dimensions of the self-heating plug 35 and the outwardly projecting barriers 44 are selected so that when positioned within the neck 11a of the fluid container, such as a baby's bottle, the outwardly projecting barriers 44 contact the inner surface of the neck 11a of the fluid container and thereby define, in combination with the inner surface of the neck of the fluid container, one or more fluid conduits which permit passage of fluid from the fluid container to the fluid delivery port 12.

The wall 36 of the self-heating plug comprises a thermally conductive material so that heat generated by the exothermic phase change material is conducted to the labyrinthine pathway 43 with the wall 36, and optionally the barriers 44, acting as a thermal bridge between the phase change material and the fluid in the labyrinthine pathways. Ideally, the outwardly projecting barriers 44 are also formed from the same thermally conductive material so that the barriers 44 may be formed integrally with the wall 36 of the plug. The outermost edge of the barriers 44, which contact the inner surface of the neck 11a of the fluid container, form a fluid seal with the inner surface of the neck of the fluid container and each barrier may carry, on its outermost edge, a fluid seal for this purpose. Ideally, the barriers 44 are semi-rigid or resilient so as to permit the plug 35 to form an interference fit with the neck 11a of the fluid container.

As shown in FIG. 9, as the heat generated by the exothermic phase change material is required at the wall 36 of the plug 35, the centre region of the compartment 37 need not, in all cases, contain phase change material and instead may include, for example, a thermally reflective material to thermally isolate the valved or bypass conduit 39 from heat generated by the phase change material. Of course, depending upon the type of phase change material employed, the compartment may be completely filled with phase change material and a bypass conduit arranged as a separate pathway between the wall 36 of the plug and the inner surface of the neck of the fluid container. Similarly, alternative means may be provided for equalising pressures either side of the plug 35 to avoid the need for any internal structure to the plug. For example, a separate air port may be included in the feeding bottle.

The self-heating plug 35 may include means (not illustrated) for heating the plug in the form of electrically resistive wires, as has been described previously in relation to the earlier examples. Alternatively, the self-heating plug 35 may be heated to re-set the phase change material by heating the plug 35 in a microwave oven or by means of immersion in hot water, for example.

The self-heating plug 35 is preferably arranged for repeated insertion and removal from the neck 11a of the fluid container. This simplifies thorough cleaning of the plug 35, and in particular thorough cleaning of the channels 43 between the barriers 44. Although not illustrated, the self-heating plug preferably includes a handle or other engaging means adapted to assist in removal of the plug from the neck 11a of the fluid container. Where the self-heating plug 35 is adapted for repeated insertion and removal, the fluid to be heated may be introduced into the fluid container 11 when the plug 35 is removed.

Alternatively, the self-heating plug 35 may be adapted to remain fixed in position in the neck of the fluid container. With this version of the self-heating plug 35, the fluid container 11 may include a removable base or part thereof, similar to the cap 25 described in earlier examples, to enable fluid to be introduced to the fluid container. Alternatively, the valved conduit 39 may be replaced with a larger fluid inlet conduit (not illustrated) for introducing into the fluid container 11 fluid which is to be heated. An inlet conduit of this type would include a one-way valve or a closure for closing the fluid inlet conduit when the self-heating plug is in use, dispensing heated fluid from the fluid container 11.

Depending upon the type of exothermic phase change material provided in the chamber 37, the neck 11a, at least, of the fluid container for use with the self-heating plug 35 of FIGS. 7 to 9, may be made of a thermally conductive material in order to control the amount of heat transferred to the fluid in the fluid pathways 43. As the neck of the fluid container functions as one wall of the labyrinthine pathways 43 and is, therefore, in contact with the fluid flowing in the labyrinthine pathways 43, excess heat may be conducted away from the fluid by means of the thermally conductive material in the neck 11a of the fluid container. Alternatively, the neck 11a, at least, of the fluid container may be thermally insulating where it is found that too much heat would otherwise be lost from the fluid as it follows the labyrinthine pathways 43. Additionally, the neck 11a, at least, of the fluid container may be at least semi-transparent to enable a user to see the fluid flowing in the labyrinthine pathways 43.

With this further alternative example of the self-heating connector and self-heating fluid container, by arranging the fluid channels on the exterior of the plug, the design and construction of the self-heating plug 35 is simplified and so can be manufactured more easily and more reliably in comparison to the earlier examples. Also, the self-heating plug 35 is particularly robust and capable of withstanding being dropped or thrown, as can often happen with young children. As a fluid sealing engagement between the plug 35 and the neck 11a of the fluid container is required, the self-heating plug 35 and the fluid container 11 are preferably provided as a unit or kit.

It is to be understood that reference herein generally to engagement of the self-heating fluid connector with the opening of the fluid container is to include, but is not limited to, engagement with the inner surface of a neck region of the fluid connector.

With all of the examples of self-heating connectors and self-heating fluid containers described herein, the exothermic phase change material preferably includes an ink or other dye to assist visual identification of any leak from the phase change material compartment. Also, ideally, at least one wall of the phase change material compartment is deformable to accommodate small changes in volume that can arise during the phase change process.

With the self-heating fluid connectors of the present invention, problems encountered with conventional self-heating containers are overcome as the bulk fluid is not heated and so problems associated with localised over-/under-heating are avoided. Moreover, by employing an exothermic phase-change material as the heat source, heat can be controllably supplied incrementally, with the total heat power required being less than would be required for heating the same amount of fluid in bulk making the fluid connector more efficient.

Although the fluid connector has been described specifically for use with a baby's feeding bottle, it will be apparent that there are many other circumstances in which the fluid connector may be used. For example, in relation to other pre-prepared drinks which would normally be drunk hot such as coffee and other beverages and also in relation to other fluid foods such as soup as well as other foodstuffs. The fluid connector is also suitable for use with fluids other than foodstuffs such as adhesives and oils which tend to flow more freely when warmed slightly. The device may also be used in medical applications in which medication and external salves may need to be administered or applied within a desired temperature range.

The invention claimed is:

1. A portable self-heating fluid connector comprising:
a portable housing having first and second opposed ends and at least one thermally conductive wall extending between the first and second opposed ends, the at least one thermally conductive wall defining in combination with the first and second ends a compartment therebetween, the housing being adapted for mounting within a fluid container having an inner surface;
an exothermic phase change material located within the compartment of the housing;
at least one barrier projecting outwardly from an exterior surface of the at least one thermally conductive wall of the housing; and
at least one initiator mounted in the housing for activating the exothermic phase change material,
whereby when the fluid connector is in use in a fluid container, the exterior surface of the at least one thermally conductive wall, the at least one barrier and a portion of an inner surface of the fluid container adjacent the fluid connector define, in combination, one or more fluid conduits which extend between the first and second ends of the housing such that the one or more fluid conduits are in thermal communication with the exothermic phase change material and
when the exothermic phase change material is activated heat is transferred to fluid caused to flow along the one or more fluid conduits.

2. A portable self-heating fluid connector as claimed in claim 1, wherein the second end is adapted for attachment to a fluid delivery port.

3. A portable self-heating fluid connector as claimed in claim 1, wherein at least one of the first and second ends includes sealing means for forming a fluid seal with the fluid container or a fluid delivery port.

4. A portable self-heating fluid connector as claimed in claim 1, wherein the initiator is a manually operable device mounted for inward movement relative to the housing, the manually operable device having an uneven surface facing towards the interior of the housing for contact with the exothermic phase change material.

5. A portable self-heating fluid connector as claimed in claim 4, wherein the manually operable device consists of a plastics material.

6. A portable self-heating fluid connector as claimed in claim 1, wherein the exothermic phase change material is selected from the group sodium acetate trihydrate, lithium acetate dihydrate, calcium chloride dihydrate, calcium nitrate tetrahydrate, magnesium chloride hexahydrate, managanese sulphate hydrate and ferric chloride hexahydrate.

7. A portable self-heating fluid connector as claimed in claim 1, further including temperature control means for controlling the temperature of the heated fluid at the second end of the fluid connector.

8. A portable self-heating fluid connector as claimed in claim 7, wherein said temperature control means comprises a bypass conduit which is thermally insulated from the heat generating material whereby fluid passing through the bypass conduit is unheated and mixes with the heated fluid at the second end of the fluid connector to thereby lower the temperature of the heated fluid.

9. A portable self-heating fluid connector as claimed in claim 8, wherein the bypass conduit includes a flow control valve for controlling the rate of flow of fluid through the bypass conduit in dependence on the temperature of the heated fluid at the second end of the fluid connector.

10. A portable self-heating fluid connector as claimed in claim 1, further comprising an electrically resistive material in the exothermic phase change material and electrical connection means connected to the electrically resistive material, the electrical connection means being adapted for connection to a source of electricity whereby the electrically resistive material functions as an internal heating element when connected to the source of electricity.

11. A portable self-heating fluid connector as claimed in claim 10, further including a source of electricity provided with the fluid connector.

12. A portable self-heating fluid connector as claimed in claim 11, wherein the source of electricity comprises one or more batteries.

13. A portable self-heating fluid connector as claimed in claim 1, wherein one or more fluid channels are interconnected.

14. A portable self-heating fluid connector as claimed in claim 1, wherein the barriers include fluid sealing means at their outermost edges for forming a fluid seal with the inner surface of the fluid container.

15. A portable self-heating fluid connector as claimed in claim 14, wherein the harriers are at least semi-rigid.

16. A portable self-heating container comprising:
a portable fluid container having a fluid outlet and an inner surface;
a self-heating fluid connector mounted within the fluid container; and,
one or more fluid conduits,
the self-heating fluid connector having:
a housing with first and second opposed ends and at least one thermally conductive wall extending between the first and second opposed ends, the at least one thermally conductive wall defining in combination with the first and second ends a compartment therebetween;
an exothermic phase change material located within the compartment of the housing; and
at least one barrier projecting outwardly from an exterior surface of the thermally conductive wall of the housing, whereby
the one or more fluid conduits extend between the first and second ends of the housing and are defined by, in combination, the exterior surface of the at least one thermally conductive wall of the housing, the at least one barrier and a portion of the inner surface of the fluid container adjacent the self-heating fluid connector such that the one or more fluid conduits are in thermal communication with the exothermic phase change material, the self-heating container further comprising at least one initiator for activating the exothermic phase change material in the compartment of the self-heating fluid connector, whereby when the exothermic phase change material is activated heat is transferred to fluid caused to flow along the one or more fluid conduits to the fluid outlet of the fluid container.

17. A self-heating container as claimed in claim 16, further including a fluid delivery port.

18. A portable self-heating fluid connector as claimed in claim 16, wherein the self-heating fluid connector is releasably mounted within the portable fluid container.

19. A self-heating baby's feeding bottle comprising:
a portable fluid container including an inner surface and a baby's feeding teat;
a self-heating fluid connector mounted within the fluid container; and,
one or more fluid conduits,
the self-heating fluid connector having:
a housing with first and second opposed ends and at least one thermally conductive wall extending between the first and second opposed ends, the at least one thermally conductive wall defining in combination with the first and second ends a compartment therebetween;
an exothermic phase change material located within the compartment of the housing; and
at least one barrier projecting outwardly from an exterior surface of the at least one thermally conductive wall of the housing, whereby
the one or more fluid conduits extend between the first and second ends of the housing and are defined by, in combination, the exterior surface of the at least one thermally conductive wall of the housing, the at least one barrier and a portion of the inner surface of the fluid container adjacent the self-heating fluid connector such that the one or more fluid conduits are in thermal communication with the exothermic phase change material, the self-heating baby's feeding bottle further comprising:

at least one initiator for activating the exothermic phase change material in the compartment of the self-heating fluid connector, whereby when the exothermic phase change material is activated heat is transferred to fluid caused to flow through the fluid conduits to the baby's feeding teat of the fluid container.

20. A self-heating baby's feeding bottle as claimed in claim 19 further including a valve for controlling a flow of air into the bottle.

21. A self-heating baby's feeding bottle as claimed in claim 19, further including a heat indicator.

22. The self-heating baby's feeding bottle as claimed in claim 19, wherein the self-heating fluid connector is releasably mounted within the portable fluid container.

* * * * *